US007025487B2

(12) United States Patent
Holzmann et al.

(10) Patent No.: US 7,025,487 B2
(45) Date of Patent: Apr. 11, 2006

(54) LIGHTING DEVICE

(75) Inventors: Hans-Peter Holzmann, Simpsonville, SC (US); Marek Djordjevic, Los Angelos, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/022,641

(22) Filed: Dec. 28, 2004

(65) Prior Publication Data

US 2005/0162862 A1 Jul. 28, 2005

Related U.S. Application Data

(63) Continuation of application No. PCT/EP2003/004483, filed on Apr. 30, 2003.

(30) Foreign Application Priority Data

Jun. 29, 2002 (DE) ................................ 102 30 277

(51) Int. Cl.
*F21V 7/00* (2006.01)
*F21V 9/08* (2006.01)
*B60Q 1/38* (2006.01)

(52) U.S. Cl. ........................ 362/546; 362/544; 362/243

(58) Field of Classification Search ........ 362/544–546, 362/237, 238, 240, 241, 243
See application file for complete search history.

(56) References Cited

U.S. PATENT DOCUMENTS

| | | | |
|---|---|---|---|
| 5,010,458 | A | 4/1991 | Fraizer |
| 5,287,258 | A | 2/1994 | Remus |
| 5,681,103 | A | 10/1997 | Remillard et al. |
| 6,296,382 | B1 | 10/2001 | Hamelbeck |

FOREIGN PATENT DOCUMENTS

| | | | |
|---|---|---|---|
| DE | 29 39 329 A1 | | 4/1981 |
| GB | 2 108 256 | * | 5/1983 |
| GB | 2 108 256 A | | 5/1983 |
| GB | 2 314 406 A | | 12/1997 |

* cited by examiner

*Primary Examiner*—Thomas M. Sember
*Assistant Examiner*—James W Cranson, Jr.
(74) *Attorney, Agent, or Firm*—Crowell & Moring LLP

(57) ABSTRACT

A lamp system, especially for a motor vehicle, has a casing that is covered by a clear, optically neutral lens and that contains at least one light source composed of a light bulb and an associated reflector. A screen in the form of a semireflecting mirror is positioned between the lens and the light source in such a way as to separate a posterior lamp section that accommodates the light source from an anterior lamp section defined by the screen and the lens. Consequently, to an observer looking in the direction of the light source, the posterior lamp section is indiscernible while the screen is transparent to the light emitted by the light bulb when the lamp is turned on.

34 Claims, 1 Drawing Sheet

LIGHTING DEVICE

This application is a continuation of international application PCT/EP2003/004483, filed Apr. 30, 2003, the entire disclosure of which is expressly incorporated herein by reference, and claims priority of German application 102 30 277.4, filed Jun. 29, 2002.

BACKGROUND AND SUMMARY OF THE INVENTION

This invention relates to a lamp system, especially for a motor vehicle, essentially consisting of a casing covered by a clear, optically neutral lens and housing at least one light source composed of a light bulb and an associated reflector.

Lamp systems for motor vehicles, especially headlight assemblies, are increasingly equipped with clear, optically neutral lenses. The necessary light distribution of the light sources situated behind the lens is obtained by an appropriate configuration of the reflectors and associated light bulbs. That requires a certain structural depth, surface contour and symmetry or asymmetry of the constituent components. In most cases the reflectors are adjustable for instance in order to permit beam-length control in adaptation to the varying weight of the vehicle load. The light sources such as filament bulbs or gas discharge lamps may additionally be provided with shielding caps. Apart from the desired structural configuration permitting various adjustments by suitable placement of the optically active components inside the lamp assembly, clear lenses are by now a must to meet conceptual design requirements. A clear lens makes the details of the often complex lamp and reflector arrangement fully visible so that, with the headlamp switched off, their physical appearance becomes a feature saliently conspicuous to the observer. Then, too, a relatively deep-seated reflector makes the headlamp or its light source look very large.

As part of the requirements of the vehicle design, one condition, besides a particular size and shape, is that the overall visual appearance of the lamp system blend in harmoniously with the overall shape of the auto body.

However, especially in the case of upper-class vehicles which should desirably give a less ostentatious appearance, strong emphasis on the physical details of a headlamp by virtue of their unobstructed visibility through the clear lens with the attendant impression of a very large headlight assembly, caused by the relatively significant depth of the reflector, is perceived as more of a drawback. Moreover, it is not always possible to use certain reflector shapes and surfaces that would optimize homogeneous light distribution and highly efficient luminous power, since they do not fit in with the design specifications and may be visually unattractive to the observer.

U.S. Pat. No. 5,010,458 describes a headlamp system with a clear cover lens. Various reflector parts inside the system may feature colored coatings harmonized with the color of the body paint. To the observer the cover lens thus appears to have the color of the surrounding body. In particular, a reflector housing and a lamp jacket may be provided with a coating the color of the surrounding body elements. Even the reflector itself may be coated with a colored layer. In that case a colored, semi-transparent metallic layer is vapor-deposited on the reflector surface, giving the reflector a colored appearance while a base layer underneath it reflects the light, when switched on, and sends the beam outward without any change in color.

A drawback of that earlier concept is that, in spite of the colored appearance of the headlamp that blends in with the surrounding body when the light is switched off, the physical details of the assembly are visible at least from up close. This is true even more so when the reflector is covered with a clear rather than a modulating lens. Moreover, in the case of multiple light sources of different colors, for instance with integrated amber directional signals, the resulting appearance is unbalanced.

It is therefore the objective of this invention to improve on the earlier lens system designs employing clear lenses in a manner whereby they create for the observer an unostentatious, visually high-quality impression independent of a reflector and lamp configuration that may be optimized in terms of the beam pattern, while blending harmoniously into the surrounding design features of the vehicle. Any effect of a technically necessary reflector and light-source configuration on the overall appearance of the lamp system should be as minimal as possible.

According to the invention, this objective is achieved by positioning a screen in the form of a semireflecting mirror between the lens and the light source, separating a posterior lamp section accommodating the light source from an anterior lamp section defined by the screen and the lens, so that to an observer looking at the lamp the posterior lamp section is indiscernible while the screen is transparent to the light beam emitted by the light source when switched on.

By positioning the screen between the clear lens and the reflector with the light source, the physical details i.e. the reflector and the light bulb or, in the case of combination lamps, the reflectors and light bulbs, will not be visible. As a semireflecting mirror the screen performs the function of a visual barrier shielding the posterior lamp section. Yet the light emitted by the lamp or lamps can pass through the mirror in unrestricted or at least nearly unrestricted fashion. The reflective surface and the relatively flat anterior lamp section defined by the screen give the entire lamp system a very "low-slung", visually attractive appearance. Since the reflectors and light sources are not visible, they can be implemented in shape and surface for an optimized light distribution without the need to consider their visual appearance. This allows for improved utilization of the technically achievable efficiency of the lamp system and a particularly homogeneous beam. Even colored light bulbs such as amber directional signals will not compromise the appearance. Overall, the lamp system will convey a high-quality, unostentatious image while at the same time compatibly permitting the use of lamp components offering highest luminous efficiency.

According to one preferred form of the invention, the screen is a base plate provided on its forward side facing the lens with a semitransparent metal coat applied by a vapor-deposit metallizing process.

Applying a metallic coat by vapor deposition permits the simple and inexpensive production of a semireflective mirror. The thickness of the metal coating is preferably held within the wavelength range of visible light, thus meeting the requirements of a semireflecting mirror with opacity on the reflective forward surface and transparency for the light beam emanating from the light source when switched on. In principle it is also possible to produce a semireflective mirror by applying a suitable single or multiple dielectric layer on the base plate of the screen.

In another preferred form of the invention the base plate consists of a clear synthetic material.

A plate consisting of a clear synthetic material can be molded in the desired shape in simple and cost-effective fashion. It is a light-weight element easily fitted and mounted in the lamp system. The transparent plastic allows the light emitted by the filament bulbs or gas-discharge lamps of the light source or sources to pass through the base plate at least with nearly unrestricted intensity.

In another preferred form of the invention, the screen is contoured to match the configuration of the light sources.

Preferably, the contour of the screen approximately follows that of the reflector. If the lamp system incorporates several reflectors, this applies in analogous fashion for these other reflectors. This will produce the appearance of a headlamp without excessive emphasis on the physical details. As a result, it will look unostentatious, not too abstract or unrealistic, thus further improving the overall attractiveness of the lamp system.

In another preferred form of implementation of the invention, the screen is mounted in a holder in the rim of the casing and/or in a holder in the rim of the lens, flush and in a tight fit with the rim of the casing and the rim of the lens.

Retaining the screen in a holder of the casing and lens rims permits a particularly secure fastening of the components when assembling the lamp system. For example, the rims of the casing and of the lens may each be provided with a circular groove in which engages a circular projection on each side of the screen. These projections may additionally be sealed on both sides by means of appropriate O-rings. The components may be connected in secure and tight fashion via interlocking catches and detents allowing them to be snapped together. Such interlocking may be designed to permit disengagement for instance when a broken lens needs to be replaced. This will have a desirable effect on the cost of any maintenance and repairs that may become necessary.

In another preferred form of the invention, the screen is firmly bonded to the rims of the casing and the lens by means of an adhesive cement.

Cementing the components together at the rims makes for a simple and inexpensive installation of the screen.

In another preferred form of the invention the screen is attached inside the casing.

Instead of being mounted along the perimeter of the casing and the lens, the screen can be easily attached inside i.e. to the inside wall of the casing. This obviates the need for any design changes in connecting the casing and the lens in order to install the screen in earlier lamp systems, thus reducing the manufacturing cost.

In another preferred form of the invention the screen is attached inside the lens.

Mounting the screen inside the lens essentially constitutes an integrated single component, with a correspondingly beneficial effect on the assembly cost.

In another preferred form of the invention, at least one interconnecting section between the screen and the casing and/or the lens is provided with means compensating for material-related differences in the coefficient of thermal expansion.

Means designed to avoid material stress between such components as the casing, screen and lens serve to prevent possible cracks caused by differences in the thermal expansion of the components during operation of the lamp system and through extraneous effects such as frost of direct exposure to sunlight. The life of the lamp system will be extended as a result. The means concerned may be provided along one or several interconnecting sections, for instance in the form of expansion joints or recesses.

Rear ventilation, for example, or other measures for dissipating the heat generated in the posterior lamp section, may serve to adequately remove any thermal load.

In another preferred form of the invention the positioning of the bulbs and reflectors is adaptable to an interaction between the light emitted by the light sources and the screen for the purpose of producing in each case a defined beam pattern.

By making the bulb and the reflector i.e. the components of the light source adaptable to an interaction between the light emitted by them and the screen it is possible to precisely maintain a light distribution that meets particularly stringent requirements. In exceptional cases involving special combinations of wavelengths of the emitted light, of screen material and coating where minor light scattering, refraction or absorption cannot be ruled out, potentially affecting a precisely predefined light distribution i.e. beam pattern, the components of the light source or sources can be suitably adapted by an appropriate component layout or selection. Since the posterior lamp section is not visible from the outside, this is possible without compromising the desired visual high-quality appearance of the lamp system. An adjustment of the light sources may compensate for the effect of the screen on the light distribution.

Further details of the invention will be evident from the following, comprehensive description of a preferred design example of the invention with reference to the attached drawing.

DETAILED DESCRIPTION OF THE INVENTION

Figure 1:
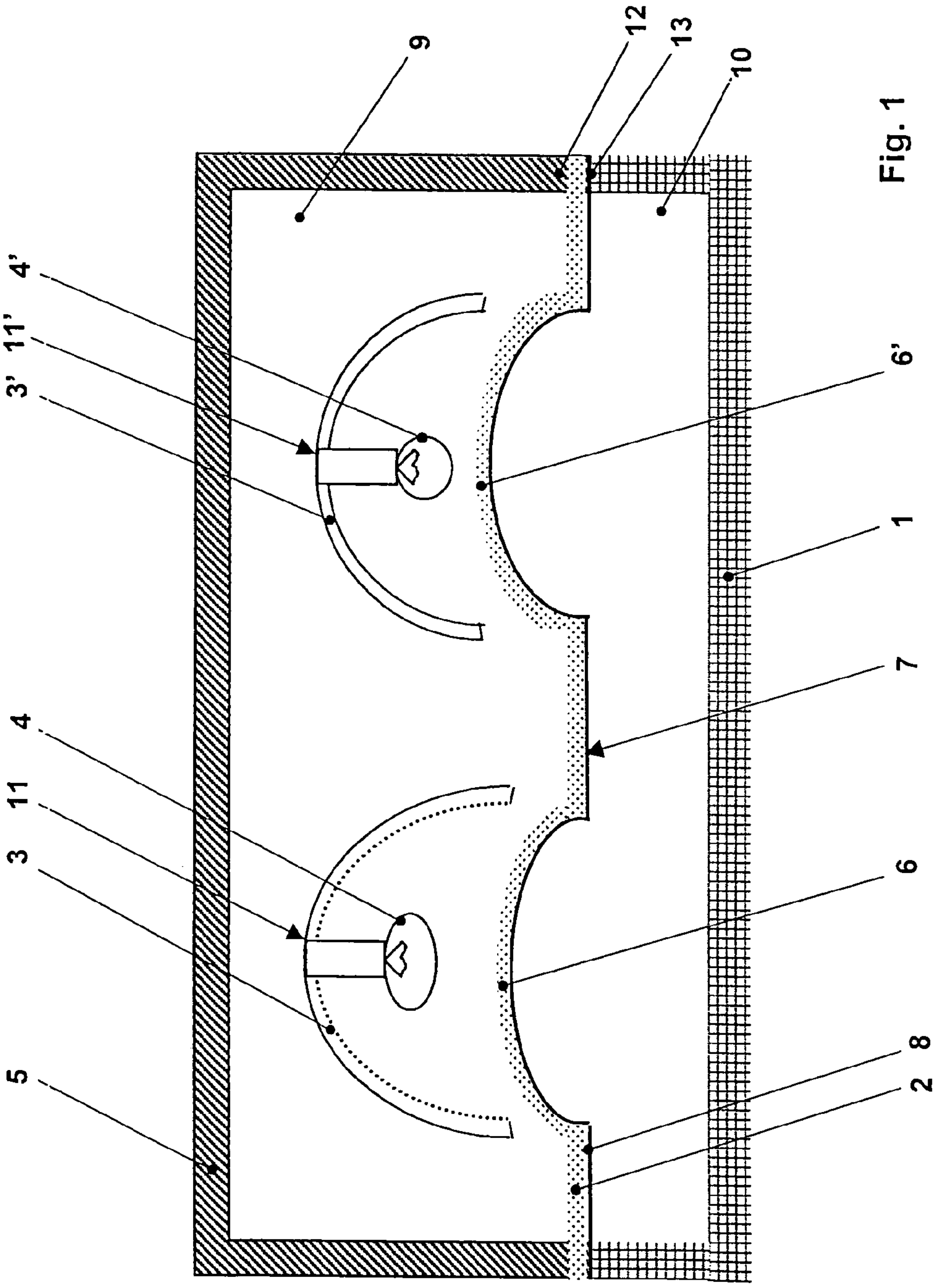
FIG. 1 is a cross-sectional top view of a lamp system.

A lamp system essentially consists of a casing 5 housing a light source 11, a screen 7 and a lens 1.

The embodiment shown in FIG. 1 has a headlamp combination with a second light source 11'. The light source 11 may for instance be a running and daytime light and the light source 11' a flashing directional signal lamp. The light sources 11, 11' are composed of a filament bulb 4 and 4' and an individually associated reflector 3, 3'; they are mounted in the casing 5 in conventional fashion and connected to a power supply and a switch circuit within the vehicle. The casing 5 is covered by the clear lens 1, a glass plate advantageously shaped in adaptation to the configuration of the headlamp assembly and contoured to match the surrounding body elements. To simplify the illustration, the outline in FIG. 1 is rectangular. The casing 5 and the lens 1 feature continuous peripheral rims 12 and, respectively, 13 in which the screen 7 is retained for instance in recesses or holders (not shown). The lens 7 is firmly connected on one side to the casing 5 and on the other side to the lens 1, for instance by way of a detent (not shown), with these connecting points sealing the lamp system against the outside. As an alternative, these connections may be made by simple adhesive bonding. The screen 7 separates a posterior lamp section 9 from an anterior lamp section 10. The posterior lamp section 9 accommodates the light sources 11, 11' and is constituted of the casing 5 and the screen 7. The anterior lamp section is constituted of the screen 7 and the lens 1. The screen 7 itself consists of a base plate 2, advantageously made from a clear synthetic material and coated on one side, its forward side facing the lens 1, with a thin vapor-deposited metallic, preferably silver layer 8, thus forming a semireflecting mirror. To the observer the screen 7 looks like a mirror when the light is turned off. The rearward lamp section 9 cannot be seen by the observer. Yet when the lamp is turned on the light emitted by the bulbs 4 and 4' and featuring the light distribution pattern generated by the reflectors 3, 3' can pass uninhibitedly through the screen 7 and to the outside.

The screen 7 is provided with two contours 6 and 6'. These contours 6, 6' approximately follow the outline of the respective reflector 3 and 3'. To the observer it appears as if he were looking into a flat i.e. shallow headlamp with a suggestion of reflectors yet without physical details, which conveys that desired unostentatious, visually high-quality appearance of the lamp system.

We claim:

1. A lamp system comprising:

a casing that is covered by a clear, optically neutral lens, at least one light source composed of a light bulb and an associated reflector contained in the casing, and a screen in the form of a semireflecting mirror positioned between the lens and the light source so as to separate a posterior lamp section that accommodates the light source from an anterior lamp section defined by the screen and the lens, wherein, to an observer looking in a direction of the light source, the posterior lamp section is indiscernible while the screen is transparent to the light emitted by the light bulb when the light source is turned on, and wherein the screen is firmly bonded by adhesive to rims of the casing and the lens.

2. The lamp system as claimed in claim 1, wherein the screen is a base plate with a front side facing the lens which is coated with a vapor-deposited, semitransparent metal layer.

3. The lamp system as claimed in claim 2, wherein the base plate is of a clear synthetic material.

4. The lamp system as claimed in claim 1, wherein the screen is provided with at least one contour adapted to the at least one light source.

5. The lamp system as claimed in claim 1, wherein the screen is mounted in a holder in at least one of a rim of the casing and a rim of the lens in flush and tight alignment with the casing rim and the lens rim.

6. The lamp system as claimed in claim 1, wherein the screen is mounted inside the casing.

7. The lamp system as claimed in claim 1, wherein the screen is mounted inside the lens.

8. The lamp system as claimed in claim 1, wherein at least one interconnecting section between the screen and at least one of the casing and the lens features provisions compensating for thermally induced material stress differentials.

9. The lamp system as claimed in claim 1, wherein, the layout of the light bulb and the reflector are arranged to interact with the screen such that an interaction of the light emitted by the bulb generates an individually defined light distribution.

10. The lamp system as claimed in claim 1, wherein the lamp system is a motor vehicle lamp system.

11. The lamp system as claimed in claim 2, wherein the screen is provided with at least one contour adapted to the at least one light source.

12. The lamp system as claimed in claim 3, wherein the screen is provided with at least one contour adapted to the at least one light source.

13. The lamp system as claimed in claim 2, wherein the screen is mounted in a holder in at least one of a rim of the casing and a rim of the lens in flush and tight alignment with the casing rim and the lens rim.

14. The lamp system as claimed in claim 3, wherein the screen is mounted in a holder in at least one of a rim of the casing and a rim of the lens in flush and tight alignment with the casing rim and the lens rim.

15. The lamp system as claimed in claim 4, wherein the screen is mounted in a holder in at least one of a rim of the casing and a rim of the lens in flush and tight alignment with the casing rim and the lens rim.

16. The lamp system as claimed in claim 2, wherein the screen is mounted inside the casing.

17. The lamp system as claimed in claim 3, wherein the screen is mounted inside the casing.

18. The lamp system as claimed in claim 4, wherein the screen is mounted inside the casing.

19. The lamp system as claimed in claim 2, wherein the screen is mounted inside the lens.

20. The lamp system as claimed in claim 3, wherein the screen is mounted inside the lens.

21. The lamp system as claimed in claim 4, wherein the screen is mounted inside the lens.

22. The lamp system as claimed in claim 2, wherein at least one interconnecting section between the screen and at least one of the casing and the lens features provisions compensating for thermally induced material stress differentials.

23. The lamp system as claimed in claim 3, wherein at least one interconnecting section between the screen and at least one of the casing and the lens features provisions compensating for thermally induced material stress differentials.

24. The lamp system as claimed in claim 4, wherein at least one interconnecting section between the screen and at least one of the casing and the lens features provisions compensating for thermally induced material stress differentials.

25. The lamp system as claimed in claim 5, wherein at least one interconnecting section between the screen and at least one of the casing and the lens features provisions compensating for thermally induced material stress differentials.

26. The lamp system as claimed in claim 6, wherein at least one interconnecting section between the screen and at least one of the casing and the lens features provisions compensating for thermally induced material stress differentials.

27. The lamp system as claimed in claim 7, wherein at least one interconnecting section between the screen and at least one of the casing and the lens features provisions compensating for thermally induced material stress differentials.

28. The lamp system as claimed in claim 2, wherein, the layout of the light bulb and the reflector are arranged to interact with the screen such that an interaction of the light emitted by the bulb generates an individually defined light distribution.

29. The lamp system as claimed in claim 3, wherein, the layout of the light bulb and the reflector are arranged to interact with the screen such that an interaction of the light emitted by the bulb generates an individually defined light distribution.

30. The lamp system as claimed in claim 4, wherein, the layout of the light bulb and the reflector are arranged to interact with the screen such that an interaction of the light emitted by the bulb generates an individually defined light distribution.

31. The lamp system as claimed in claim 5, wherein, the layout of the light bulb and the reflector are arranged to interact with the screen such that an interaction of the light emitted by the bulb generates an individually defined light distribution.

32. The lamp system as claimed in claim 6, wherein, the layout of the light bulb and the reflector are arranged to interact with the screen such that an interaction of the light emitted by the bulb generates an individually defined light distribution.

33. The lamp system as claimed in claim 7, wherein, the layout of the light bulb and the reflector are arranged to interact with the screen such that an interaction of the light emitted by the bulb generates an individually defined light distribution.

34. The lamp system as claimed in claim 8, wherein, the layout of the light bulb and the reflector are arranged to interact with the screen such that an interaction of the light emitted by the bulb generates an individually defined light distribution.

* * * * *